(12) United States Patent
Heddaya et al.

(10) Patent No.: US 6,205,481 B1
(45) Date of Patent: Mar. 20, 2001

(54) PROTOCOL FOR DISTRIBUTING FRESH CONTENT AMONG NETWORKED CACHE SERVERS

(75) Inventors: Abdelsalam A. Heddaya, Waltham, MA (US); Sulaiman A. Mirdad, Rivadh (SA); David J. Yates, Norwood; Ian C. Yates, Boston, both of MA (US)

(73) Assignee: InfoLibria, Inc., Waltham, MA (US)

( * ) Notice: Subject to any disclaimer, the term of this patent is extended or adjusted under 35 U.S.C. 154(b) by 0 days.

(21) Appl. No.: 09/040,520

(22) Filed: Mar. 17, 1998

(51) Int. Cl.[7] .................. G06F 15/173; G06F 15/167
(52) U.S. Cl. .................... 709/226; 709/216; 709/223
(58) Field of Search .................................. 709/216, 218, 709/226, 230, 238, 202, 223, 104, 105; 711/141; 340/825.06; 707/10, 201, 203; 345/329, 330, 331

(56) References Cited

U.S. PATENT DOCUMENTS

| | | | |
|---|---|---|---|
| 4,897,781 | 1/1990 | Chang et al. | 364/200 |
| 5,261,069 | * 11/1993 | Wilkinson et al. | 711/145 |
| 5,282,201 | 1/1994 | Frank et al. | 370/94.1 |
| 5,500,860 | 3/1996 | Perlman et al. | 370/85.13 |
| 5,511,208 | * 4/1996 | Boyles et al. | 709/223 |
| 5,521,913 | 5/1996 | Gridley | 370/58.2 |
| 5,592,626 | 1/1997 | Papadimitriou et al. | 395/200.09 |
| 5,598,581 | 1/1997 | Daines et al. | 392/872 |
| 5,640,504 | 6/1997 | Johnson, Jr. | 395/182.02 |
| 5,758,072 | * 5/1998 | Filepp et al. | 709/220 |
| 5,787,470 | * 7/1998 | DeSimone et al. | 711/124 |
| 5,933,849 | * 8/1999 | Srbljic et al. | 711/118 |

FOREIGN PATENT DOCUMENTS

WO 99/48003    9/1999    (WO) .

OTHER PUBLICATIONS

Frivold et al., "Extending WWW for Synchronous Collaboration", SRI International, pp. 1–8, Sep. 1994.*
Vitali et al. "Using Versioning to Support Collaboration on the WWW", 4th Inter. WWW Confer., pp. 190–203, Dec. 1995.*

Gray, Stephen, "Roger Jennings' Database Workshop: Microsoft Transaction Server 2.0", Sams, Macmillan Computer Pub., excerpt pp. 1–4, Nov. 1997.*

Spectrum Software, "Special Ed. Using Microsoft Exchange Server 5.5", Que, Macmillan Compuer Pub., excerpt Chapter 29, pp. 1–9, Dec. 1997.*

Anstey, David A., "High Performance Oracle8 Object–Oriented Design: Your Complete Guide to Creating Fast, Efficient Database Systems", The Coriolis Group, excerpt pp. 1–4, Feb. 1998.*

Heddaya, A. et al., "WebWave: Globally Load Balanced Fully Distributed Caching of Hot Published Documents," International Conference on Distributed Computing Systems, 1900, pp. 160–168, (1997).

* cited by examiner

Primary Examiner—Mark Rinehart
Assistant Examiner—Jason D. Cardone
(74) Attorney, Agent, or Firm—Hamilton, Brook, Smith & Reynolds, P.C.

(57) ABSTRACT

A technique for automatic, transparent, distributed, scalable and robust replication of document copies in a computer network wherein request messages for a particular document follow paths from the clients to a home server that form a routing graph. Client request messages are routed up the graph towards the home server as would normally occur in the absence of caching. However, cache servers are located along the route, and may intercept requests if they can be serviced. In order to be able to service requests in this manner without departing from standard network protocols, the cache server needs to be able to insert a packet filter into the router associated with it, and needs also to proxy for the home server from the perspective of the client. Cache servers cooperate to update cache content by communicating with neighboring caches whenever information is received about invalid cache copies.

13 Claims, 11 Drawing Sheets

PROTOCOL FOR DISTRIBUTING FRESH CONTENT AMONG NETWORKED CACHE SERVERS

BACKGROUND

Computer networks, such as the Internet, private intranets, extranets, and virtual private networks, are increasingly being used for a variety of endeavors including the storage and retrieval of information, communication, electronic commerce, entertainment, and other applications. In these networks certain computers, known as servers, are used to store and supply information. One type of server, known as a host or home server, provides access to information such as data or programs stored in various computer file formats but generically referred to herein as a "document". While in the Internet the documents are typically primarily composed of text and graphics, each such document can actually be a highly formatted computer file containing data structures that are a repository for a variety of information including text, tables, graphic images, sounds, motion pictures, animations, computer program code, and/or many other types of digitized information.

Other computers in the network, known as clients, allow a user to access a document by requesting that a copy be sent by the home server over the network to the client. In order for a client to obtain information from a home server, each document typically has an address by which it can be referenced. For example, in the context of the Internet and within the communication protocol known as Hyper Text Transfer Protocol (HTTP), the address is typically an alpha-numeric string, known as a Uniform Resource Locator (URL), that specifies (a) an address of the home server from which to obtain the information in the form of a name or a numerical address, and (b) a local information text string that identifies the information requested by the client, which may be a file name, a search request, or other identification.

After the user specifies a URL to the client computer, the address portion of the URL is sent over the network to a naming service such as the Domain Name Service (DNS) in order to obtain instructions for how to establish a connection with the correct home server. Once the connection with the server is established, the client can then retrieve the desired document by passing the local information text string over the network directly to the home server. The server then retrieves the document from its local disk or memory storage and transmits the document over the network to the client. The network connection between the home server and the client is then terminated.

Computer and network industry analysts and experts are presently quite concerned that traffic on the Internet is becoming so heavy that the very nature of the way in which it is possible to use the Internet may change. In particular, many individuals now believe that the Internet is intolerably slow and is no longer a reliable entity for the exchange of information in a timely fashion.

The present bottlenecks are no doubt the result of exponential increases in the number of users as well as in the number of complex documents such as multimedia files being sent. It might appear that the answer is simply to add more bandwidth to the physical connections between servers and clients. This will come, however, only at the expense of installing high bandwidth interconnection hardware, such as coaxial or fiber optic cable and associated modems and the like, into homes and neighborhoods around the world.

Furthermore, added bandwidth by itself perhaps would not guarantee that performance would improve. In particular, large multimedia files such as for video entertainment would still potentially displace higher priority types of data, such as corporate E-mails. Unfortunately, bandwidth allocation schemes are difficult to implement, short of modifying existing network communication protocols. The communication technology used on the Internet, called TCP/IP, is a simple, elegant protocol that allows people running many different types of computers such as Apple Macintoshes, IBM-compatible PCs, and UNIX workstations to share data. While there are ambitious proposals to extend the TCP/IP protocol so that the address can include information about packet content, these proposals are technologically complex and would require coordination between operators of many thousands of computer networks. To expect that modifications will be made to existing TCP/IP protocols is thus perhaps unrealistic.

An approach taken by some has been to recognize that the rapidly growing use of the Internet will continue to outstrip server capacity as well as the bandwidth capacity of the communication media. These schemes begin with the premise that the basic client-server model (where clients connect directly to home servers) is wasteful of resources, especially for information which needs to be distributed widely from a single home server to many clients. There are indeed, many examples of where Internet servers have simply failed because of their inability to cope with the unexpected demand placed upon them.

To alleviate the demand on home servers, large central document caches may be used. Caches are an attempt to reduce the waste of repeated requests for the same document from many clients to a particular home server. By intercepting parallel requests, a cache can be used to serve copies of the same document to multiple client locations.

From the client's point of view, the interaction with a cache typically occurs in a manner which is transparent to the user, but which is slightly different from a network messaging standpoint. The difference is that when the address portion of the request is submitted to the Domain Name Service (DNS) to look up the information needed to connect to the home server, the DNS has been programmed to return the address of a cache instead of the actual original home server.

Alternatively, a server node, acting as a proxy for the client, may issue probe messages to search for a cache copy. Once a cache copy is found at a particular node in the network, the request is then forwarded to that node. For example, under the auspices of the National Science Foundation, document caches have been placed at various locations in the United States in order to eliminate bottlenecks at cross-oceanic network connections. Generally, certain of these caches located on the West Coast handle requests for documents from the Asia-Pacific and South American countries, and a number of those located on the East Coast handle requests for documents from Europe. Other of these national caches handle requests for popular documents located throughout the United States.

However, such caching techniques do not necessarily or even typically achieve optimum distribution of document request loading. In particular, in order for the caches to be most effective, the DNS name service or other message routing mechanism must be appropriately modified to intercept requests for documents for which the expected popularity is high. The introduction of cache copies thus increases the communication overhead of name resolution, because of the need to locate the transient copies. The name service must register these copies as they come into existence, disseminate this information to distribute demand for the documents, and ensure the timely removal of records for deleted cache copies. Often times, the cache lookup order is fixed, and/or changes in document distribution must be implemented by human intervention.

Unfortunately, frequent and pronounced changes in request patterns can force the identity, location, and even the number, of cache copies to be highly transient. The resulting need for updating of cache directories means that they cannot typically be replicated efficiently on a large scale, which can thus turn the name service itself into a bottleneck.

Another possible approach to implementing caches is to change the client/server interaction protocol so that clients proactively identify suitable cache copies using a fully distributed protocol, for example, by issuing probes in randomized directions. Aside from the complexity of modifying existing protocols and message cost introduced by such an approach, such a scheme also adds one or more round trip delays to the total document service latency perceived by the client.

SUMMARY OF THE INVENTION

The present invention is an automatic and transparent scheme for distributing updated document content that exploits the fact that the paths that document requests follow through a computer network from a client to a particular document on a particular home server naturally form a routing graph, or tree.

Cache servers are placed throughout the network, such that if a document request can be fulfilled at some intermediate node along the routing graph, it will be serviced by the intermediate node returning the cached document to the client. The document request messages are thus responded to before they ever reach the home server. Since document request messages are permitted to be routed from clients in the direction of the home server up the routing graph in the same manner as would occur in the absence of caching, naming services do not need modification.

In order to be able to service requests in this manner without departing from standard network protocols, the cache server also preferably acts as a communication protocol proxy for the home server. That is, as part of fulfilling document request messages at the intermediate node locations, the client is sent appropriate messages, depending upon the communication protocol in use, to spoof the client into believing that the document was actually received from the home server.

Specific to the present invention is a distributed protocol for the cache servers to maintain and propagate updated document versions among themselves and the home servers. In a preferred embodiment, this is accomplished by the cache servers providing hit reports to the corresponding home server whenever they service a document request message locally. The home server then replies with an indication that the document has been updated. The cache server then invalidates its copy. As a result, no two consecutive document requests will receive the same instance of the document unless it is the current version.

However, freshness of a cached document can be determined other ways, such as periodically or at scheduled update times. The cache server may also learn of an invalid document upon receiving information from neighboring cache servers.

Upon learning that a document has changed, a cache server adds an identifier for the document such as its URL to a list of modified documents. Upon sending a message to a neighboring cache server, a request is made to return the requested document copy if a more recent copy is contained in the neighboring cache. The neighboring caches also preferably cooperate to ensure that document lists exchanged remain updated, so that the rate of queries submitted to home servers is reduced.

According to the invention, the cache servers obtain and share information learned about updates to cached documents, so that updated content is provided to the clients. This sharing of information occurs by directly interacting with the originating servers, by sending status messages to neighboring cache servers, and as a consequence, by indirect interaction with non-neighboring cache servers.

In a first scenario, a cache server may learn about updates to a cached document when forwarding a hit report to an originating server. The hit report serves two purposes, namely, to notify the originating server of the hit, as well as to obtain the time of the last modification of the document. Upon learning of a change in a cached document, the cache server adds a document identifier to a list of modified documents.

A cache server may also learn about changes to cached documents by receiving information from a neighboring cache server. In particular, the cache servers send gossip messages to neighboring cache servers that indicate their status to one another, to locate the neighborhood hierarchy. In addition, the gossip messages include the list of modified documents to the neighboring server messages contain the list of modified documents. Preferably, the list of modified documents is checked to remove any information which has most recently been received from the particular neighboring cache server. The cache server deletes document identifiers from the list of modified documents once they have been sent to all neighboring cache servers.

When a neighboring cache server receives the gossip message, it invalidates or updates and copies it has of documents listed in the modified document list, and then merges the remaining information into its own list of modified documents. A copy of the modified document list as received may be maintained, in order to avoid returning information to the cache server when it is time for the neighboring cache server to gossip about its own information.

The invention eliminates the need for home servers to be polled periodically by large numbers of cache servers to check for content freshness, thereby reducing the load on the home servers.

There are several advantages to the basic concepts of a document caching system according to the invention.

First, the approach does not need to request an address lookup from a cache directory, to redirect document requests, or to otherwise probe other elements of the network to locate cache copies. Location of the cache copy thus occurs fortuitously, along the natural path that the request message follows anyway. The client thus does not experience delays or bottlenecks associated with waiting for other entities in the network to find appropriate cache copies.

In addition, the system as a whole permits cache copies of documents to diffuse through the network as needed, which in turn diffuses bottlenecks at the caches and well as along the communication paths.

There is also a corresponding reduction in network bandwidth consumption and response time, because cache copies are always placed nearer to the original server than to the client. Document request messages and the documents themselves therefore typically do not need to travel the full distance between the server and each client every time they are requested. Hence, an overall network bandwidth is conserved, response times are reduced, and load is more globally balanced.

The invention thus not only helps to dampen differences in the load demand on the host servers, but also reduces the load on network communication resources, without requiring any modification to existing network protocols.

Furthermore, because cache copies are distributed through the network, there is no single expected point of failure of the caching system, and the system is robust and fail-safe.

The technique is also scalable, in the sense that as more cache servers are added, both clients and servers experience a likewise benefit.

With respect to the document freshness protocol in particular, the document caches can be expected to propagate fresh content among themselves, by direct interaction with one another, and indirectly, as a result of forwarding new information to their neighboring caches. This reduces the need for home servers to respond to update requests.

BRIEF DESCRIPTION OF THE DRAWINGS

For a more complete understanding of the advantages provided by the invention, reference should be had to the following detailed description together with the accompanying drawings, in which.

DETAILED DESCRIPTION OF PREFERRED EMBODIMENTS

1. Introduction

Figure 1:
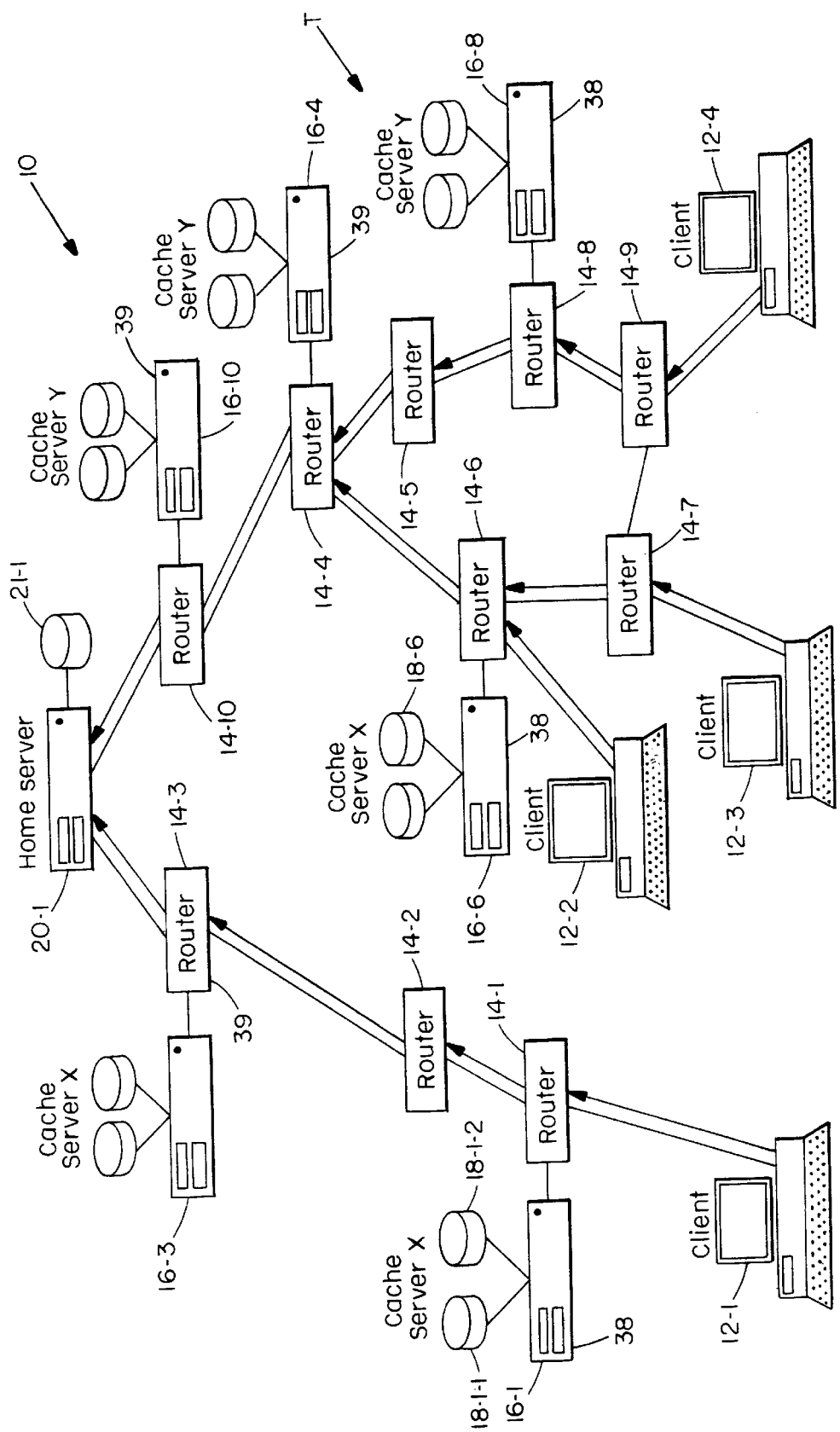
FIG. 1 depicts a typical computer network showing a request path for a single document and the location of cache servers along the path according to the invention.

Turning attention now to FIG. 1, a computer network 10 such as the Internet, extranet, private intranet, virtual private network, local area network, or any other type of computer network consists of a number of network entities including client computers 12-1, 12-2, 12-3, . . . , 12-4 (collectively, clients 12), routers 14-1, 14-2, . . . , 14-10, cache servers 16-1, 16-3, 16-4, 16-6, 16-8, and 16-10, and home server 20. The network may make use of any and various types of physical layer signal transmission media such as public and private telephone wires, microwave links, cellular and wireless, satellite links, and other types of data transmission.

In the illustrated network, certain routers 14 have associated with them cache servers 16, whereas other routers do not have associated cache servers. The cache servers 16 include various types of storage for documents in the form of a cache storage 18-1 which may include disk storage 18-1-1 and/or memory storage 18-1-2.

The clients 12 and home server 20 operate as in the prior art to permit distribution of a wide variety of information, typically in the form of "documents". Such documents may actually contain text, graphics, pictures, audio, video, computer programs and any number of types of information that can be stored in a computer file or parts of a computer file. Furthermore, certain documents may be produced at the time that access is requested to them, by executing a program.

It will be assumed in the following discussion that the network 10 is the Internet, that the information is encoded in the form of the Hyper Text Transfer Protocol (HTTP) documents, and that document request messages are sent in the form of Uniform Resource Locators (URLs) using the TCP/IP layered protocol. This is with the understanding that other types of wired, switched, and wireless networks, and other types of protocols such as FTP, Gopher, SMTP, NNTP, etc. may make advantageous use of the invention. In addition, although the invention is discussed in the context of a client-server type of communication model, it should be understood that the principals of the invention are equally applicable to peer-to-peer networks.

A request message for a particular document, for example, originates at one of the client computers, such as client 12-1. The message is a request by the client 12 for the home server 20 to send a copy of the document that is presently stored at the home server 20 location such as on a disk. The document request message is passed through one or more routers 14, such as routers 14-1, 14-2, 14-3, in the direction of the illustrated arrows, on its way to the home server 20.

In networks such as the Internet, document request messages may pass through as many as fifteen or more nodes or "hops" through routers 14 before reaching their intended destination. Requests for the same document from other clients, such as clients 12-2, 12-3, or 12-4 also pass through different routers 14 on their way to the home server 20 at the same time.

It should also be understood that although the routers 14 and cache servers 16 are shown as separate elements in FIG. 1, that their functionality may be combined into a single element.

A model is useful for understanding the nature of how requests from multiple clients for one particular document travel across a path the computer network 10. The model is that structure, T, which is induced by the effect of routing algorithm on the document request messages as they travel through the network to the home server 20. As shown in FIG. 1, the home server 20 can thus be thought of as being at the root node of the structure, T, with document requests originating at the leaf node levels farthest away from the root, namely at clients 12-1, 12-2, . . . , 12-4. The structure T also includes many intermediate nodes which are located the routers 14.

While the structure T of the set of paths that client requests follow toward a given home server 20 is accurately and generally described as a data directed, acyclic graph, the present exposition does not benefit from the added complexity. In particular, when a single particular document is considered as being located at only one home server, the structure can be referred to as a tree with a single root. With that understanding we use the term tree to describe the structure Therein, with the understanding that a graph model may also be used. With this model in mind, the entire Internet can be thought of as a forest of trees or graphs, each rooted at a different home server 20 which is responsible for providing an authoritative permanent copy of some set of documents.

Copies of documents are located in the network at cache servers 16. In a preferred embodiment of the invention, the placement of cache copies, and hence the diffusion of load, is constrained to nodes in the tree structure, T. This avoids the need for clients to lookup the locations of cache copies, either by directly contacting the home server 20, or a naming service such as a Domain Name Service (DNS), or by probing the network in search of appropriate cache copies.

The preferred embodiment also assumes that cache servers 16 lie on the path along the tree that document request messages would naturally take from the client 12 to the home server 20, with the cache servers 16 cooperating to off-load excess load at the home server 20, or to diffuse other potential performance bottlenecks such as communication links themselves. In effect, the routers 14 having associated cache servers 16 inspect document request message packets as they fly-by and intercept any request for which it may be possible to fulfill by providing a cached document instead.

In a most general description of the operation of the invention, document request messages travel up the tree T, from a client at which it originated, such as client 12-3, towards the home server 20. Certain routers encountered by the document request message along the way, such as router 14-7, do not have local cache servers 16, and thus simply pass the document request message up to the next router in the tree, such as router 14-6.

However, certain other routers, such as router 14-6, do have a local cache server 16-6, in which case the document request message is examined to determine if it is seeking a document located in the local cache store 18. If a cache copy is encountered at cache server 16-6, then that copy is returned to the client 12, and the request message is not permitted to continue on its way to the home server 20. If however, a cache copy is not encountered at the particular cache server 16-6, the request message continues to the next router 14-4 on the path to the home server 20.

When a request message packet enters a router 14, the router first passes the request message to a portion of its software referred to herein as the filter code. The filter code in the router 14 is updated as necessary by the local cache server 16. The filter code depends on the types of packets, the cache contents, the load at the local cache server 16, or the load on the attached communication links. The filter causes the interception of the packet (for an attempted service by the local cache server 16) or passes the packet back to the router 14 to determine the next hop the packet should take on its way to the home server 20.

Ideally, the implementation of the cache servers 16 is such that no changes are required to the normal operating mode of either clients 12 or servers 20. Another goal is to have a design that can be gradually deployed into the existing infrastructure of the network 10. This also requires that any new mechanisms preferably be compatible with existing communication protocols.

Figure 2:
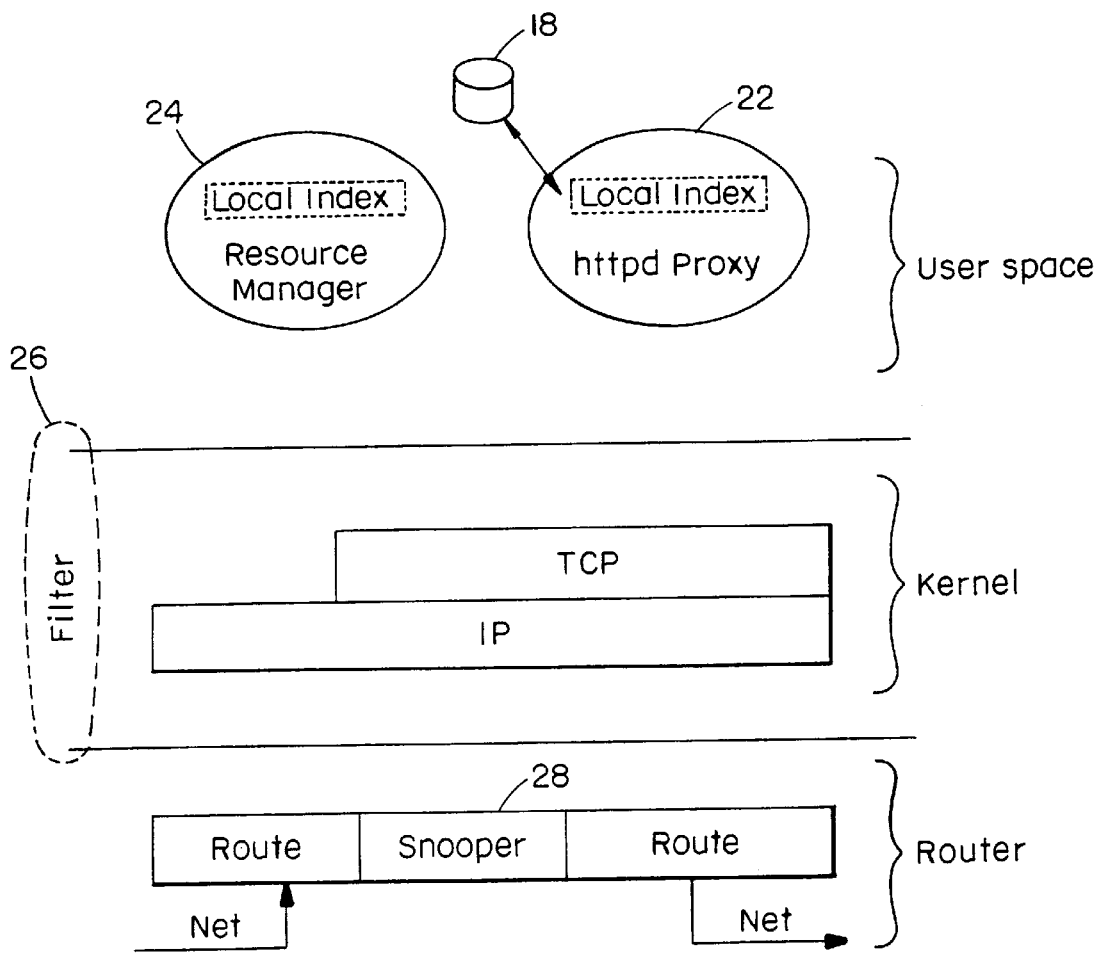
FIG. 2 is a communication layer diagram illustrating how a resource manager, protocol proxy, and snooper are used to implement the invention.

To accomplish this, a cache server 16 and associated router 14 preferably consist of four functional building blocks, as shown in the layer diagram of FIG. 2. At a relatively higher layer protocol level, such as the application layer, the cache server 16 includes an HTTP proxy 22 and a resource manager 24. At a lower layer, such as the physical layer, the router typically implements a packet filter 26 and an IP proxy or snooper 28.

The HTTP proxy 22 implements a standard HTTP protocol with responsibilities including storage management and the maintenance of the index structures necessary for accessing cached documents. If the HTTP proxy 22 receives a request for a document not located in the local cache 18, it requests the document from the home server 20 and respond to the request when the document arrives. The HTTP proxy 22 is configured to cache documents only as instructed by the resource manager 24.

While FIG. 2 shows two types of proxying, namely at the HTTP and IP level, it should be understood that the implementation can also include proxying at other layers, including the application layer, IP layer, or some other layer in between, such as a transport, session, presentation, or other layer.

The resource manager 24 implements a protocol to diffuse document copies through the network 10, as will be described in greater detail below. The resource manager 24 is responsible for maintaining state information used by the document load diffusion mechanism. The resource manager may be programmed to not only manage the load on the cache servers 16 themselves, but may also be programmed to manage the traffic on the communication paths used interconnect the routers 14.

To accomplish this load management, or load balancing, the resource manager 24 maintains information about the identity and the load of its neighboring cache servers 30. The details of how neighboring cache server information is maintained is discussed below in Section 3.

In addition, for each document in the cache 18, the resource manager 24 distinguishes between requests received through each of its neighboring cache servers 30. This is done by maintaining a separate hit count for requests received from each neighboring cache server 30. Using such information, the resource manager 24 computes the fraction of excess load to be diffused. Once these fractions are determined, the resource manager 24 informs its under-loaded neighbors 30 which document to cache and the fraction of requests they should undertake. These fractions are also used to generate new filter code to be injected into the associated router 14. A similar process is performed by the under-loaded neighbors 30. If necessary, the resource manager 24 at the under-loaded neighbor 20 informs the attached HTTP proxy 22 to add new documents to its cache 18.

Other responsibilities of the resource manager 24 include neighborhood discovery, propagating load information to the neighboring servers 30, and discovering and recovering from potential barriers to load balancing. These mechanisms are discussed in more detail below.

The routers 14 take an active role in assisting cache servers 16 to achieve cache server and/or communication path balancing goals. This is accomplished by allowing the resource manager 24 to inject functionality into the router 14 in the form of the code that implements the filter 26 and snooper 28. In particular, all packets passing through a router 14 not addressed directly to a host server 20 are first passed to the snooper 28. The snooper 28 inspects a packet and determines its type, destination, and the document requested. Depending on the state of the cache server 16 and packet type, the snooper 28 could intercept the packet or simply forward the packet to the next hop, or router 14, along the intended destination path to the home server 20.

To determine if a requested document is located at the local cache server 16, the snooper 28 queries the filter 26. If the filter 26 indicates that the requested document is cached and can be serviced locally, then the packet is intercepted and passed to the resource manager 24. Otherwise, the packet is passed on to the next hop towards the destination home server 20.

The snooper 28 is typically aware of the TCP protocol and the structure of both TCP and HTTP packets. Another functionality of the snooper 28 is to extract copies of HTTP request packets and pass them up to the resource manager 24. This feature is used to assist the resource manager 24 in discovering its neighborhood and recovering from potential barriers.

2. Handling an HTTP Document Request in a TCP/IP Network

Current implementations of networks 10 that use HTTP rely on the layered TCP/IP protocol for reliable end-to-end communication between clients 12 and servers 20. This layering divides the normal processing of a request message into three steps; connection establishment (i.e., TCP-level three way handshake in the form of {SYN} messages), HTTP document request/reply in the form of {GET} messages, and connection termination in the form of {FIN} messages.

Figure 3:
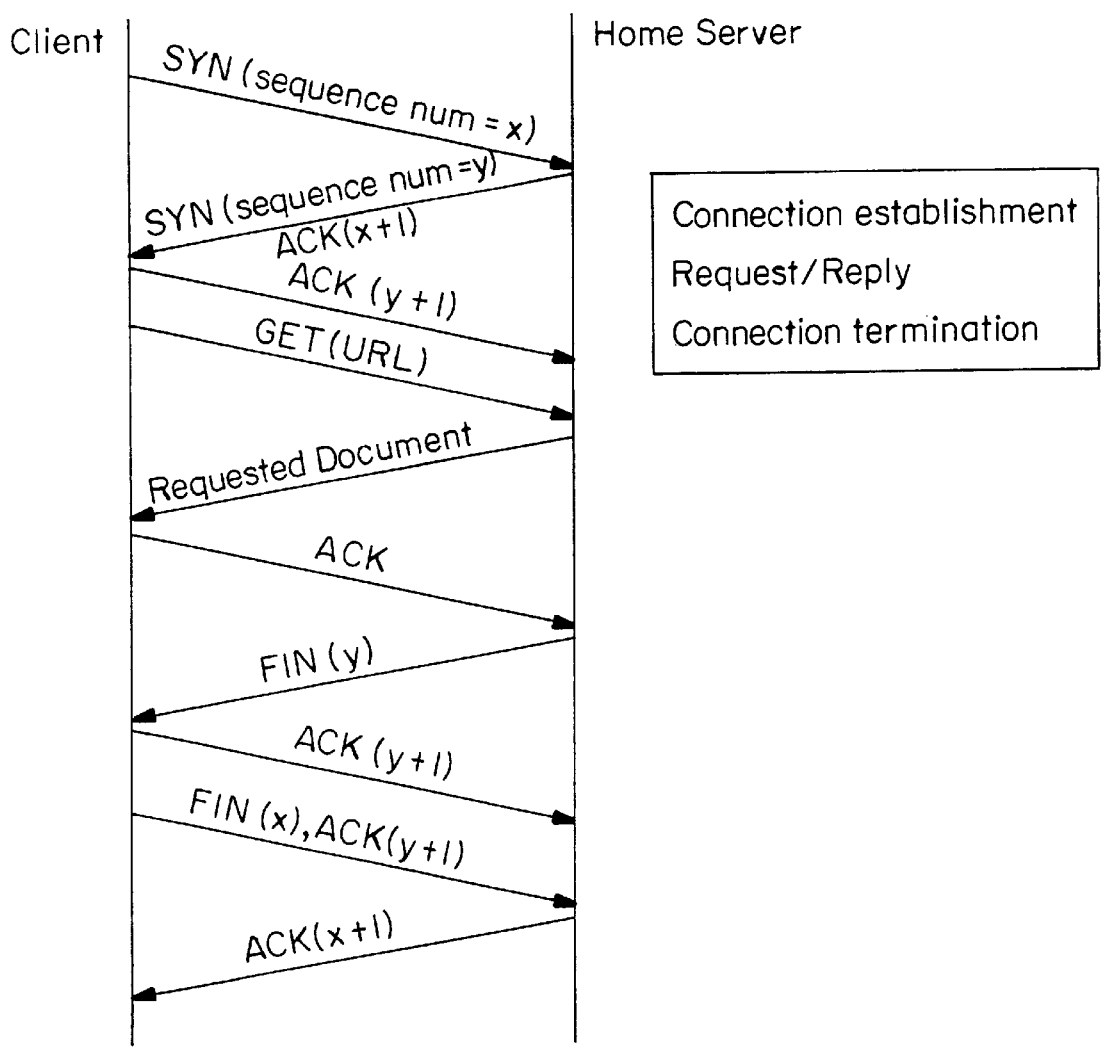
FIG. 3 shows the typical stages in a document request over the network.

This process is depicted in FIG. 3, where the client 12 first issues a {SYN} message with a sequence number to the home server 20, and the home server 20 returns a {SYN} message with an acknowledgment {ACK}. In response to this, the client 12 then sends a document request in the form of a {GET} message that includes the URL of the desired document. The document is then forwarded by the home server 20 to the client 12. After the client 12 returns an acknowledgment, the server 20 and client 12 terminate the connection by exchanging {FIN} and {ACK} messages.

The main hurdle in actually implementing the cache servers 16 as explained above in such an environment is the requirement that they need to identify the document requested by a client 12. However, as seen in FIG. 3 the URL information is typically advertised by an HTTP client 12 only after a TCP/IP connection has already been established with the home server 20. One possible solution would thus be to have all such connections be established with the home server 20 and have snoopers 28 at intermediate routers 14 intercept all {GET} packets. Even though this approach might relieve a significant amount of load from a home server, it still required that TCP connections associated with such documents reach the home server 20, which defeats the purpose of attempting to off-load the home server 20. During high demand periods, such requests would amount to a flood of {SYN} requests on the home server 20. In addition, if the initial {SYN} is not intercepted, both establishing and tear down of connections becomes significantly more complicated.

To overcome this hurdle, in the preferred embodiment, intermediate routers 14 have some awareness of the TCP protocol. TCP aware routers 14 are able to detect TCP connection requests to all HTTP servers (i.e., a {SYN} packet directed to the HTTP port), and have the ability to act as a proxy for, or "spoof" the home server 20.

This functionality is implemented by the snooper 28. In particular, snoopers 28 located in routers 14 on the path to a home server 20 inspect packets that fly-by, identify such packets, and intercept any {SYN} packets directed to HTTP home servers 20. As {SYN} packets do not contain any information identifying which document the client 12 intends to request, the snooper 28 acts as a proxy for, or "spoofs" the home server 20, by establishing a connection between the client 12 and the local transport layer in the cache server 16, and noting the initial sequence numbers used by both the client 12 and the local transport layer.

After the connection is established the snooper 28 inspects all packets that fly-by, and waits for the corresponding {GET} request. Once the {GET} request arrives the snooper 28 queries the local filter 26 and the resource manager 24 to determine if the requested document is cached. If the document is cached the snooper 28 forwards the HTTP {GET} message to the local resource manager 24, waits for the resource manager 24 to service the request, and then terminates the connection. Otherwise, the requested document is not cached (i.e., the filter 26 or resource manager 24 missed). Several different approaches may be taken to servicing the document request at this point.

In a first approach, the TCP connection is handed off, wherein the snooper 28 closes the server half of the spoofed TCP connection with the client 12, and forwards the document request in the form of a composite "piggy back" {SYN+GET} message in the direction of the home server 20. In addition, the {SYN+GET} message contains all the state information needed to hand-off the server half of the TCP connection to any other intermediate cache server on the path to the home server 20 which happens to cache the requested document.

In a second alternative approach, the snooper may act as a TCP relay, maintaining the TCP connection with the client, and relaying the {SYN+GET} message on a separate connection to the next intermediate cache server on the path to the home server 20.

Figure 4:
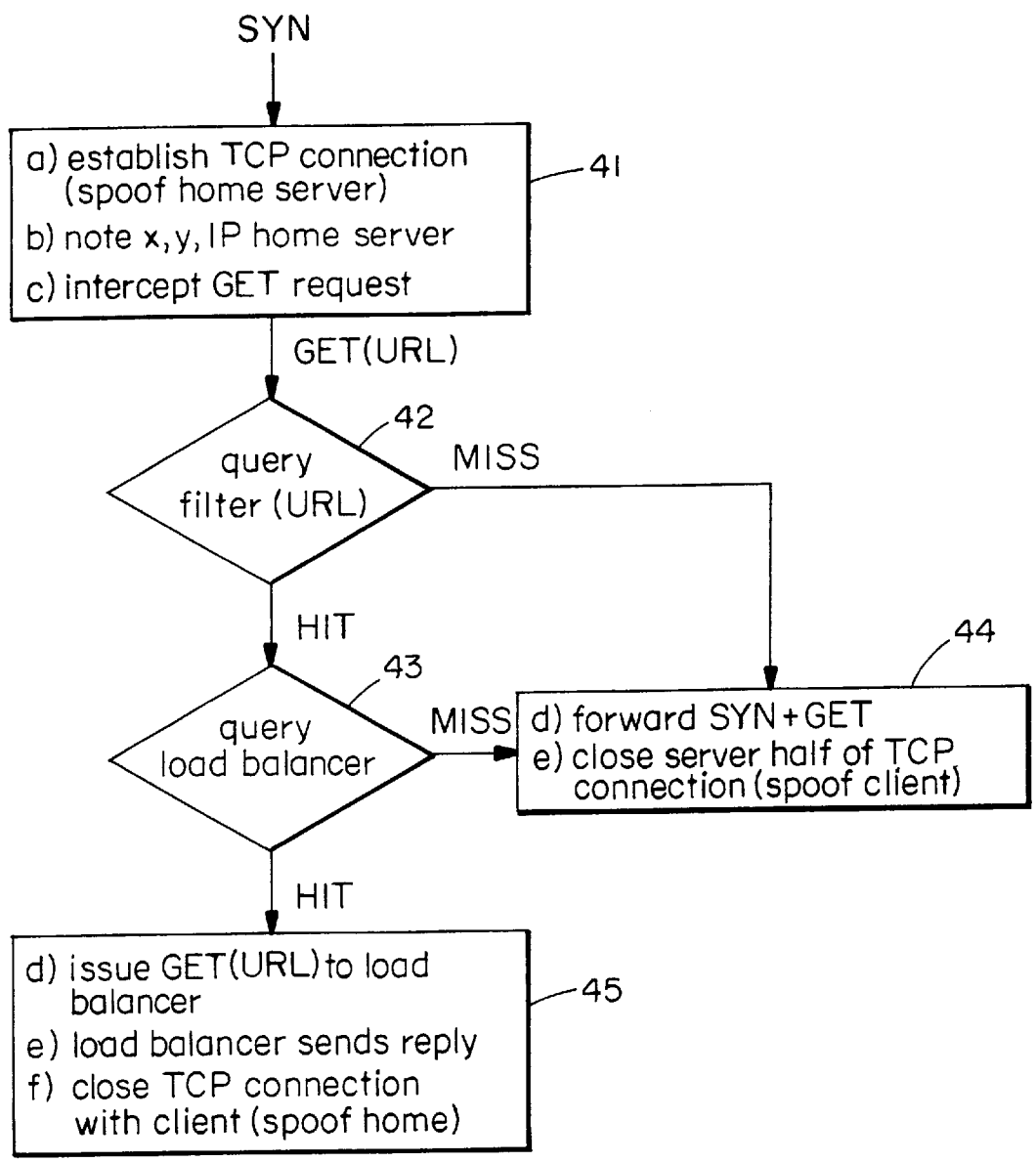
FIG. 4 is a flow chart of the operations performed by a leaf server located on the routing path according to the invention.

The above hand-off process is illustrated in the flow chart of FIG. 4. This process is carried out by a particular class of cache servers 16 referred to as leaf node servers 38, which are the cache servers 16 that are on the extreme lower level nodes of the tree T, i.e., the first servers to intercept a {SYN} packet from a client 12. The leaf node servers 28 in the tree T depicted in FIG. 1 are cache servers 16-1, 16-6, and 16-8.

As shown in step 41 of FIG. 4, when a leaf node server 38 receives a {SYN} packet, the home server 20 is proxied for, or "spoofed", by establishing a TCP connection directly between the leaf node server 38 and the client 12. The leaf node server 38 then waits to intercept the corresponding {GET} request from the client 12.

Note that spoofing thus occurs in the sense that packets exchanged between the client 12 and a cache server 16 are modified by the snooper 28 in the above scenario. In particular, the network address of a cache server 16 which is servicing a request is replaced with the network address of the home server 20 and in a connection handoff, the sequence numbers of bytes issued by the cache server 16 have to follow the sequence number as determined by the leaf server 38.

Returning to step 41, if the requested document passes the cache query test by the filter 28, and in step 42, and if the resource manager 22 detects that the document is present in the local cache and will permit access to it, then the document request is serviced locally, in step 45. In step 45, the {GET} command is forwarded to the resource manager, which then replies with the requested document. Finally, the TCP connection between the leaf server 38 and the client 12 is closed, by spoofing the home server 20 once again and issuing the closing {FIN} and {ACK} messages to the client.

Otherwise, if there is a miss in step 42 or 43, the snooper 28 forwards a {SYN+GET} packet in the direction of the home server 20, and then closes the server half of the spoofed TCP connection, so that another cache server on the tree may service it if possible. The steps d) and e) in FIG. 4 may be asynchronous events and may typically occur in parallel. The snooper 28 at a leaf server 38 then has to acknowledge the reception of the {GET} request.

In the scenario depicted in FIG. 1, the upstream intermediate non-leaf nodes 39 include those with cache servers 16-3, 16-4, and 16-10. The cache servers 16 located at the non-leaf nodes 39 need to process {SYN+GET} packets in a slightly different manner. In particular, the snooper 28 in a non-leaf node 39 intercepts {SYN+GET} packets only if the requested document is cached and the local cache server 16 has sufficient capacity to service it.

Figure 5:
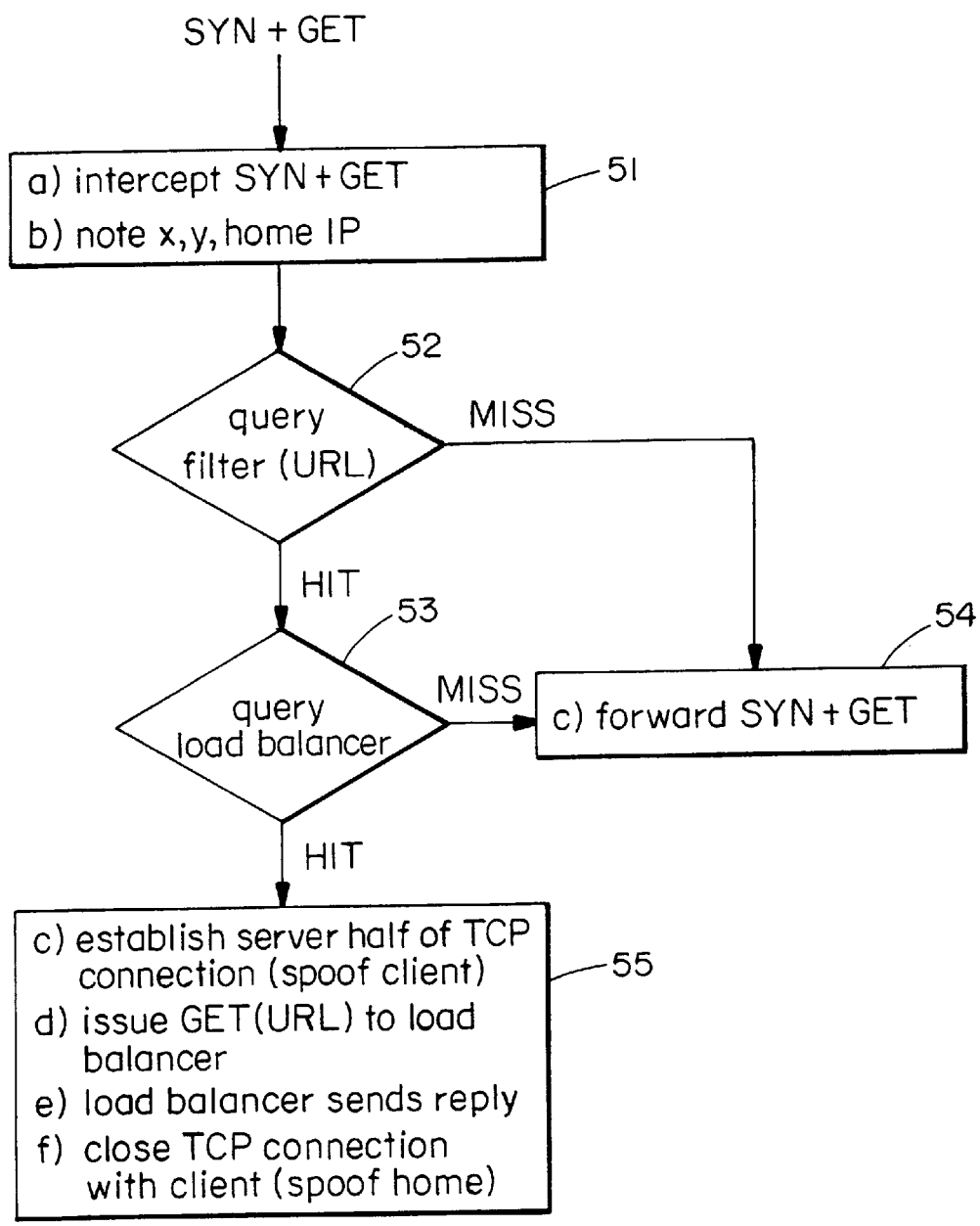
FIG. 5 is a flow chart of the operations performed by an intermediate non-leaf cache server.

FIG. 5 is a detailed flow chart of this process as performed at the non-leaf intermediate nodes 39. As shown in step 51, to service such a request, the snooper 28 first spoofs upon receipt of the {SYN} from the leaf node 38, and intercepts the following {GET} request. In the following steps 52 and 53, queries are made to the filter 26 and resource manager 24 as before, to determine if the {GET} can be processed locally.

If the request can be processed locally, step 55 completes the proxying for the home server 20 by establishing the server half of the TCP connection with the client 12, issuing the {GET} to the resource manager 24, returning the document to the client 12, and closing the TCP connection.

If the {GET} message cannot be processed locally, step 54 is executed, where the {SYN+GET} is forwarded to the next node in the tree T.

The main advantage of processing {SYN+GET} packets differently in the intermediate non-leaf nodes 39 is that a TCP connection is only handed-off once to the particular intermediate node 39 that actually has the requested document. Another advantage is that the {SYN+GET} contains all the state information needed for connection hand-off (i.e., no additional state information is exchanged between the snooper 28 at the leaf node server 38 and that at the intermediate node 39 which is actually caching the requested document.)

One drawback of piggy-backing {SYN+GET} packets in this manner is that home servers 20 will not interpret such packets properly without adapting their transport protocol to deal with such packets. To avoid this problem and ensure inter-operability with current network protocols, an additional precaution can be taken by requiring that the snooper 28 located at the last intermediate node 39 before a home server 20 intercept all {SYN+GET} packets. Thus, when none of the leaf node servers 38 or intermediate node servers 39 cache the requested document, the last intermediate server 39 intercepts the {SYN+GET} and relays an explicit HTTP {GET} request to the home server 20.

Figure 6:
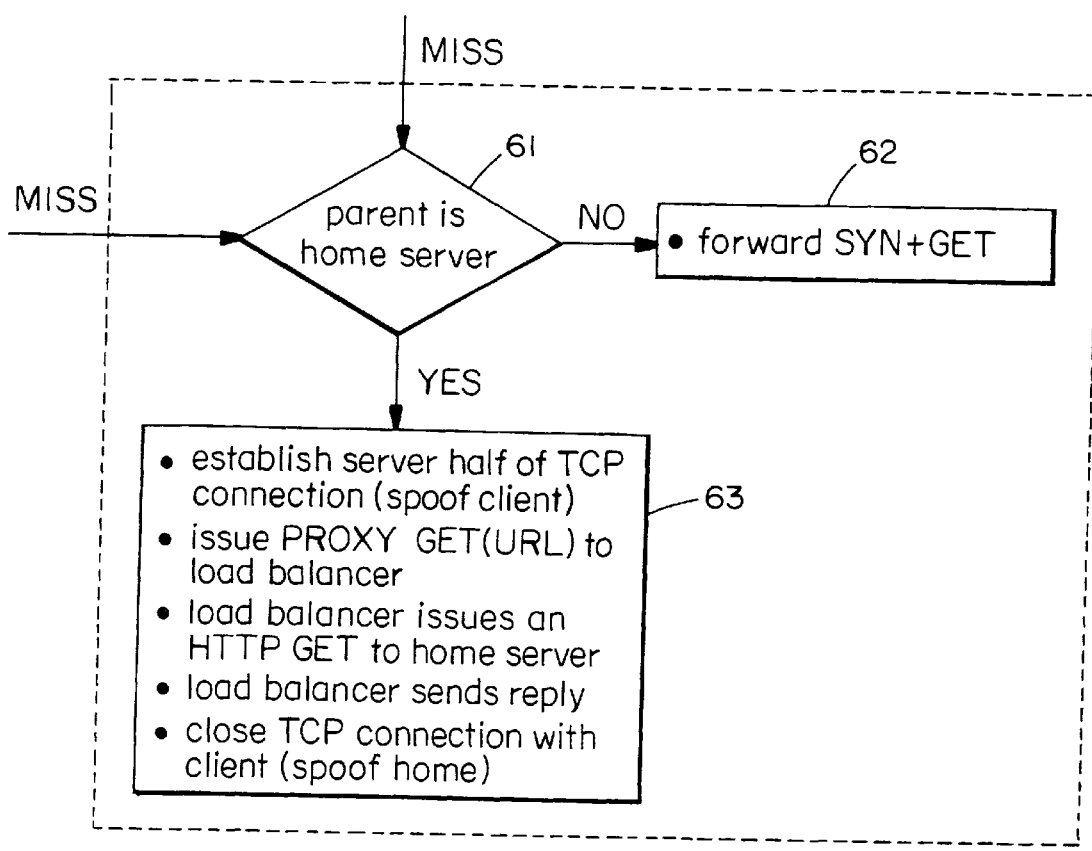
FIG. 6 is a flow chart of the operations performed by a last cache server on the routing path.

To accommodate this case, step 54 of FIG. 5 can be replaced with the processes illustrated in FIG. 6. In this case, in step 61, where the next upstream node along the path, T, (or parent node) is not the home server 20, then step 62 is entered, where the {SYN+GET} is forwarded to the next intermediate node on T.

However, if the next node is a home server 20, then the step 63 is performed. In particular, snooper 28 establishes the server half of the TCP connection with the client 12, and replaces the {SYN+GET} with a {PROXY_GET} request to the local resource manager 24. The resource manager 24 translates the {PROXY_GET} request to an explicit {GET} issued to the home server 20. The response of the home server 20 response is then relayed to the client 12 in the same manner as if the cache server was caching the requested document.

Figure 7:
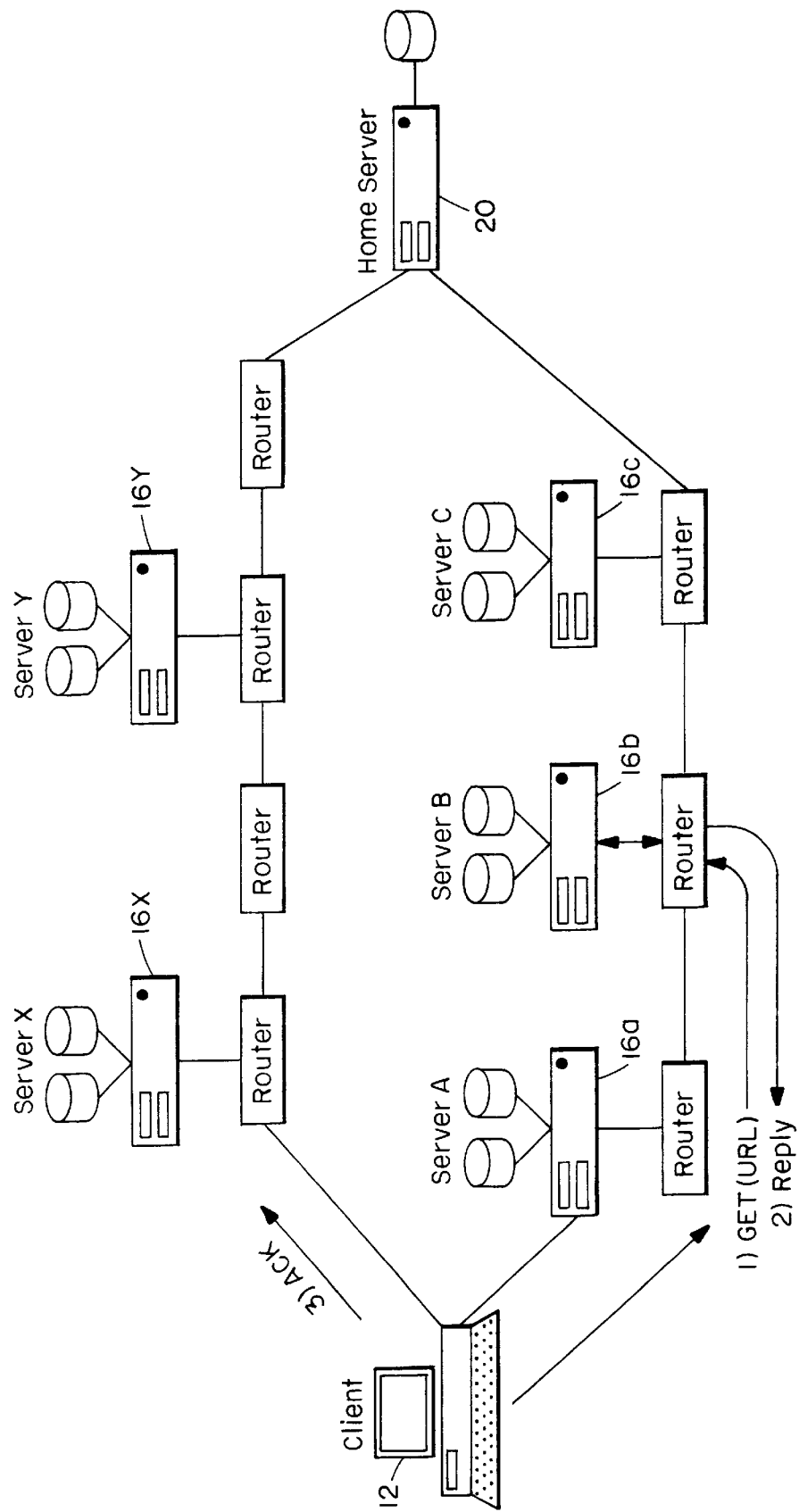
FIG. 7 illustrates the interception of a document request message by an intermediate server.

Another shortcoming of the caching technique described thus far is that the path along the tree T between a particular client 12 and the home server 20 can change after a leaf node server 38 or an intermediate node server 39 decides to service a request. This may occur, for example, when a network connection, or link, is lost between two server nodes. FIG. 7 shows this relatively rare case where the path between the client 12 and the home server 20 changes while an intermediate cache server 16b is processing a document request from client 12. All {ACK}s sent by the client 12 will now follow the new path, through a new cache server 16x, to the home server 20. This causes cache server 16b to time-out and retransmit its packets.

To solve this problem, the snooper 28 at server 16b may keep track of the number of times a packet is retransmitted. If a packet is re-transmitted more than a predetermined number of times, for example, three times, the snooper 28 then assumes that the path between the client 12 and the home server 20 has changed, and then takes steps to terminate the connection with the client 12. In particular, the snooper 28 aborts the connection with the client 12 and aborts the connection with cache server 16b, simultaneously spoofing the home server 20 and sending a reset packet (i.e., an {RST} packet) to the client 12.

In another approach the leaf node servers 28 closest to the clients 12 and the last hop nodes closest to the server 20 are provided with only one possible route to the clients 12 and servers 20, respectively. This is accomplished by having the cache servers forward client request messages over cache server—to—cache server permanent TCP connections, instead of simply letting the request messages follow their normal routes. The set of connections, being implemented as a set of properly joined TCP connections, thus automatically adapts to any changes in IP routing as the network configuration changes.

3. Neighborhood Discovery

However, any resulting changes in the configuration of adjacent cache servers must also be detected by communication with neighboring cache servers in order to achieve resource load balancing and other advantages possible with the invention. In particular, each cache server 16 participating in the above-described scheme has to determine which other servers are in its neighborhood. In addition, on each routing tree T, a cache server 16 has to distinguish between upstream servers (located at parent nodes) and down stream servers (located at child nodes). A particular node, i, in the tree T is the parent of a node j, if i is the first cache server 16 on the route from j to the home server 20, in which case node j is also referred to as the child of node i.

One method for a cache server 16 to discover its neighborhood requires some assistance from the underlying router 14 and snooper 28. At selected times, the resource manager 24 asks the local router 14 to issue neighborhood discover messages to each destination in a routing table which the router 14 maintains.

These neighborhood discovery packets are then intercepted by a given snooper at another node having a cache server 16 in the tree. It is then responsibility of the intercepting cache server 16 to send a reply to the resource manager 24 at the cache server 16 that issued the neighborhood discover packet, announcing that it is a parent (e.g., that it is closer to the home server 20 than the issuing cache server) and the identity of the tree T that it is on. The destination port for neighborhood discover packets may be assigned an unlikely port number, to ensure that the destination home server 20 does not attempt to process un-intercepted neighborhood packets. A hop count field can also be used to limit neighborhood discover packets from excessive forwarding.

The main drawback of this approach is that it would flood the network with neighborhood discover packets. An alternative approach is to use document request message packets (i.e., the {SYN+GET} packets) that fly-by the filter in each cache server 16 anyway.

In this approach, each document request message contains a field identifying the previous hop, that becomes, under the scenario implemented above, an identification of the last cache server 16 that a particular request packet passed through.

As a request passes through a router 12 (i.e., it is not intercepted), the local snooper 28 stamps the IP address of the attached cache server 16. When a cache server 16 wants to discover its neighborhood, it then instructs its attached snooper 28 to extract the last observed destination and last hop address from request packets and then passes this information up to the local resource manager 24.

Figure 8:
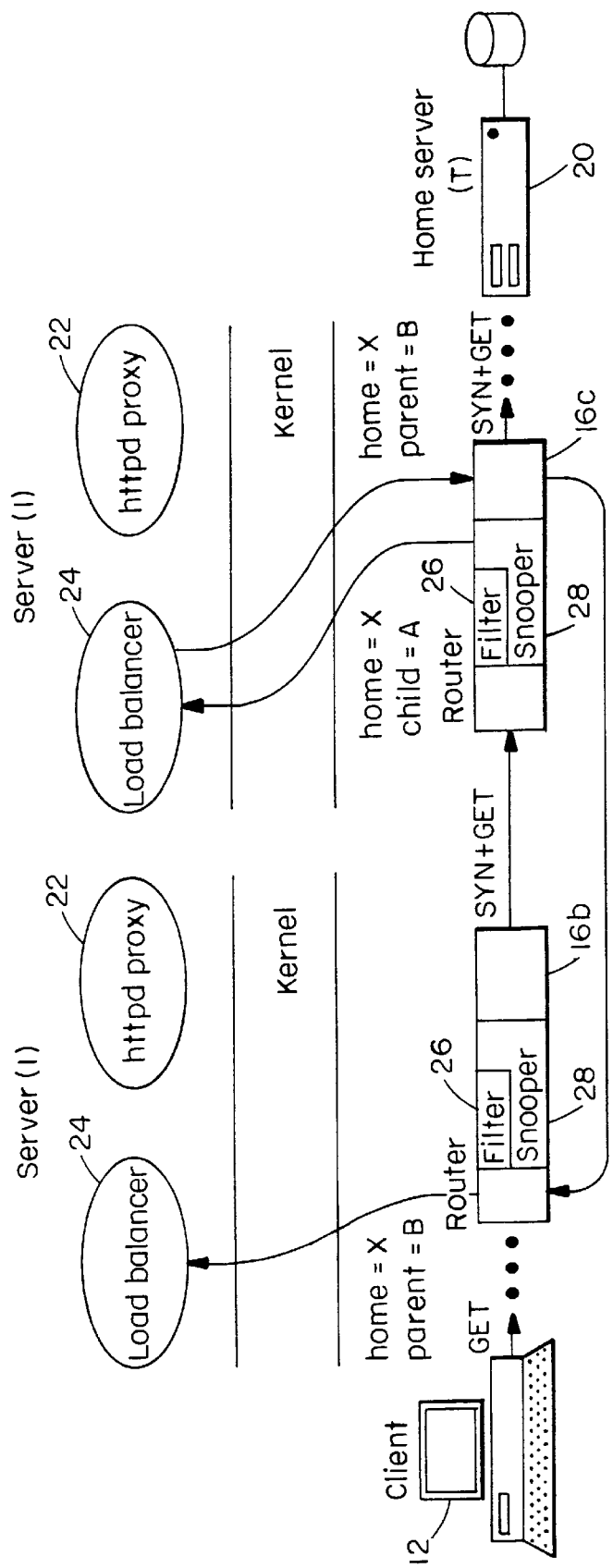
FIG. 8 also illustrates the interception of a document request message in more detail.

As shown in FIG. 8, a typical HTTP {GET} message follows a path from the client 12 through A to the home server 20 and is intercepted by intermediate cache 16c. While cache server 16c is processing the request, the path between the home server 20 and the client 12 changes causing all acknowledgments to use a different path.

Using this information the resource manager 24 at cache server 16c determines both which routing trees it is on and any down stream cache servers 16 on each tree. Once server 16c determines that server 16b is its downstream child on tree T, cache server 16c has to explicitly inform cache server 16b that it is its parent on T. To reduce the number of messages exchanged between the different components (snoopers 28 and resource managers 24), the snoopers 28 can cache a number of packets and forward them all at once to the resource managers 24.

Neighborhood information is maintained for a predetermined number, such as two, of neighborhood discovery epochs. If no requests are received through a child cache server 16b during these periods, the child cache server 16b is removed from the cache server 16c's model of the neighborhood. The parent cache server 16c then also informs the child cache server 16b of its intention to do so.

It is also possible that a cache server 16 does not have a parent snooper 28 on the routing tree to the home server 20. In this case, the snooper 28 at cache server 16b sends a neighborhood discovery packet in the direction of the home server 20. An upstream snooper such as the one at server 16c receives the packet and informs 16b that it is its parent on the tree to the home server 20. However, if the snooper 28 at 16b does not have a parent node such as 16c on the tree to home server 20 it replaces 16b address on the neighborhood discovery packet and forwards it in the direction of the home server 20.

This neighborhood discovery scheme has a number of advantages. First, the routing tree T does not have to be completely constructed for the caching protocol to start operating. Another advantage is that the cooperating cache servers 16 can dynamically discover and adapt to routing changes. Finally the protocol is totally distributed and is therefore robust against server failures.

4. Propagating Fresh Content Among Cache Servers

While the above mentioned cooperation between cache servers 16 works well for initially distributing copies of documents to the cache servers 16, it does not specifically address efficient distribution of updated content among them. The above scheme of neighborhood discovery lends itself to a particularly advantageous way of distributing updated content.

Therefore, in the preferred embodiment each of the cache servers 16 shares information about updates to cached documents that it learns from its neighboring cache servers 16. This may happen via direct interaction with neighboring caches 16 when clients request documents, and also indirectly as a result of cache servers 16 periodically sharing information with their neighbors.

In general, upon the occurrence of certain events, or at scheduled or estimated expiration for particular documents, each cache server 16 checks the freshness of the documents that it maintains. Upon learning of a change in the source documents as maintained by the home server 20, the cache server 16 propagates this fact to its neighbors by sending status or so-called "gossip" messages. In addition, the cache server continues to respect any "do not cache" annotations provided by the home server 20, and continues to honor any at a reload requests from clients which may still have copies of the earlier version of the document.

Figure 9:
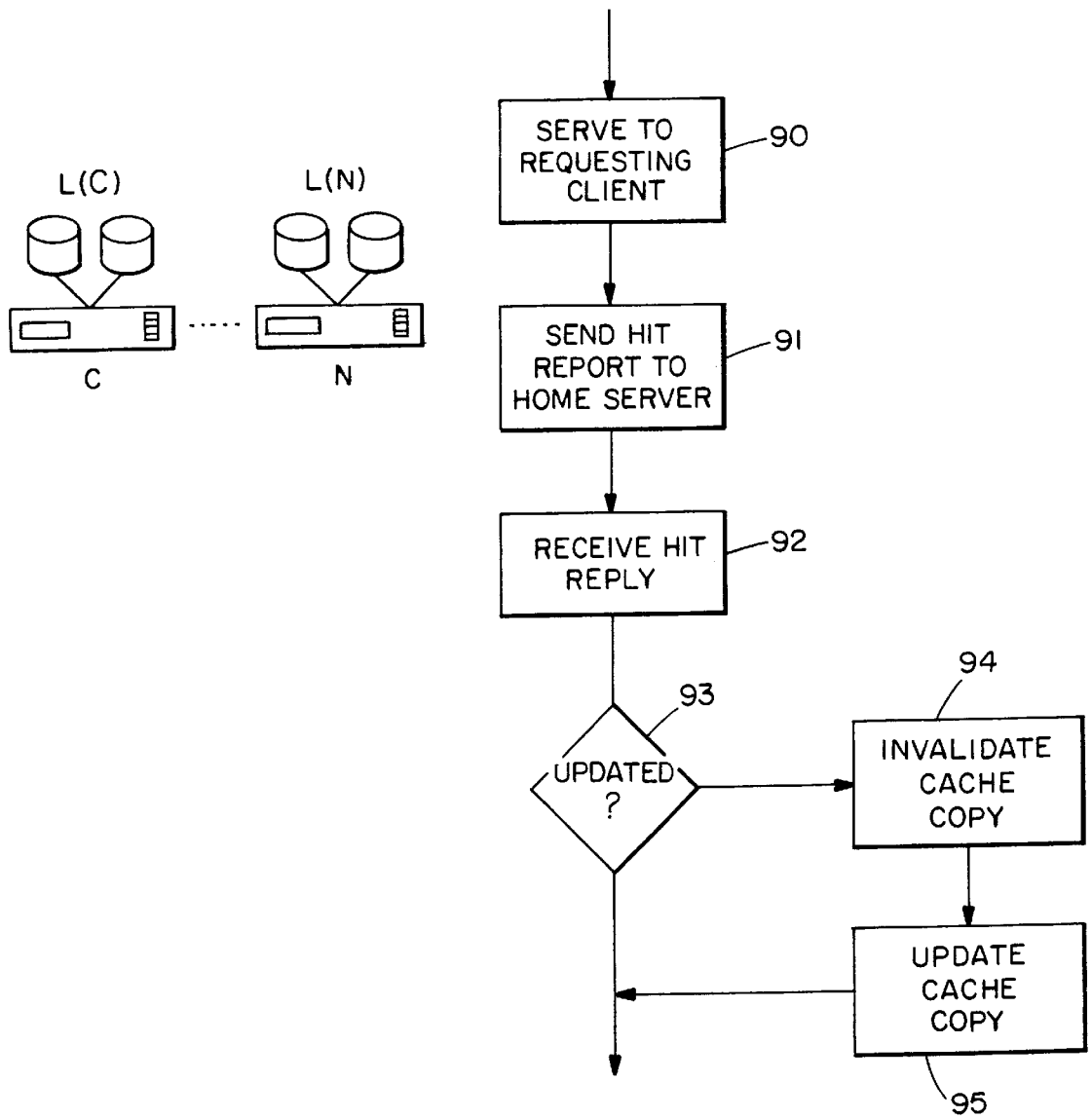
FIG. 9 is a flow chart of the steps taken by a cache server in one embodiment of the intention to discover that document copies are no longer fresh.

The specific protocol for maintaining freshness among the cache servers 16 is shown in a sequence of steps of FIG. 9. While this sequence of steps shows one preferred manner of determining if a change has been made in a particular cached document, it should be understood that other techniques could be used. For example, a cache server C can learn of a change in a particular cached document X via a number of different mechanisms. For example, the cache server C may forward a hit report to the home server for document X, and receive a reply that indicates that document X has changed. In addition, the cache server C may be informed that document X has changed by one of its neighboring cache servers.

Returning attention to FIG. 9, the certain data structures are maintained by a cache server 16 expressed from the point of view of a particular cache server C and its neighboring cache server N. Cache server C keeps a list L(C) of names or other identification such as the URL, of recently modified documents that periodically exchanges with its neighbors, N. Each of the neighbors N also keeps a corresponding list L(N). The notation L(C, N) indicates the copy of the list L(C) that the neighboring server N has most recently received from the cache server C.

Upon receiving a request for cached document X, a state 90 is entered in which cache server C serves the requested document X to the requesting client.

At the same time, the cache server C sends a hit report to the home server in state 91. The sending of the hit report serves two purposes, namely notifying the home server 20 of the hit, and also to determine the time of last modification of the document X of the home server.

The hit reports provided in state 91 to the home server are sent as a message which is marked so that it is not intercepted by any other cache server 16 on the path between cache server C and the home server 20.

In a next state 92, a reply to the hit report is received. In state 93, if the reply indicates that the requested document X has been updated since it was last cached by cache server C, then the cache server C proceeds to state 94 in which its local cache copy is invalidated. This process of invalidating the local cache copy may also include a state 95 to request an updated cache copy from the originating server. However, to minimize network traffic, this preferably not done, and the requesting client is permitted to keep a copy of the document which was not current. In this scenario, no two consecutive requests will receive the same instance of the document X unless it is a current version.

Returning back to state 93, if the originating server indicates by its reply that the version of the document was current, then no further processing is necessary.

In an alternate embodiment, the order of certain steps shown in FIG. 9 may be changed. For example, if it is desired to always serve fresh content to the client, the hit report of step 91 is sent to the home server first, followed by the processing of the reply in steps 93 through 95, prior to serving the cache copy to the client in step 91. This ensures that the clients always receive fresh content, at the expense of having to wait for a reply to the hit report first.

Figure 10A:
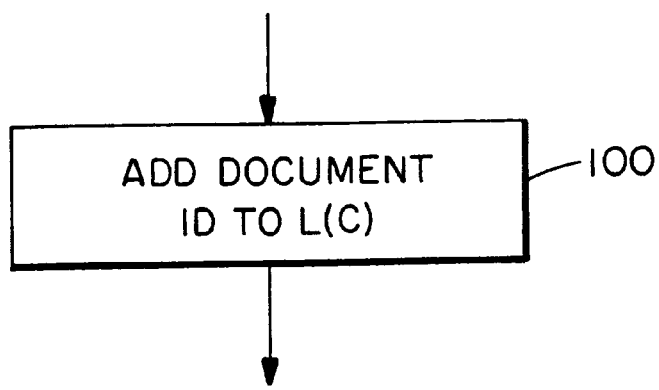
FIGS. 10A and 10B illustrate a sequence of steps taken upon learning of a change in a cached document.
Figure 10B:
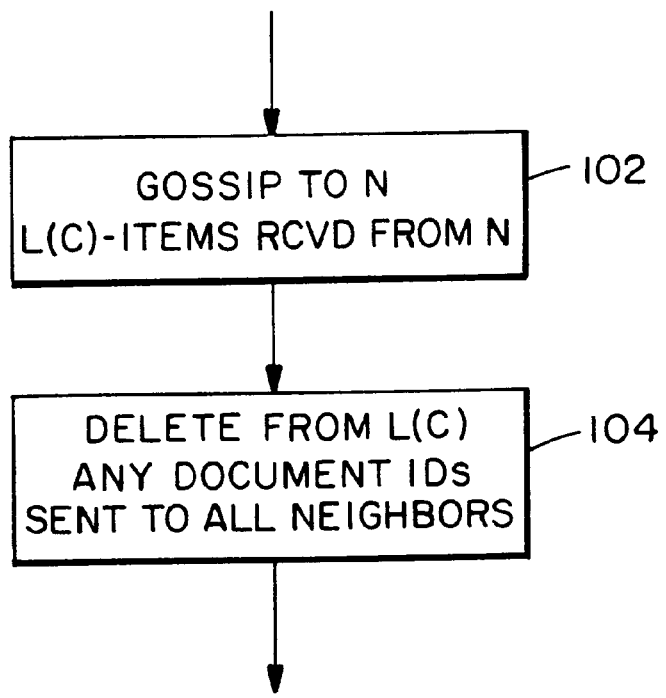

FIGS. 10A and 10B indicate a sequence of a steps performed by the cache server upon learning of a change document X. As previously described, this state 100 may be entered via a number of different mechanisms such as the process described in FIG. 9 or in other ways. In any event, upon learning of a modification to a cached document, in state 100 the cache server C adds the identifier of the document X to its list of modified documents L(C).

Eventually a state 102 is entered in which the cache server C sends status or gossip messages about its present state to neighbor N. When sending this gossip message to a neighbor N, the cache server C includes in its message a copy of the present state of its list L(C) minus any items that has had most recently received from its neighbor N. This step 102 eliminates the possibility of sending to neighboring cache server N any information already known to neighboring cache server N.

In a next following state 104, the cache server C deletes from its list L(C) any document identifications that have already been sent to all of its neighbors. This step maintains the list L(C) to be current.

Figure 11:
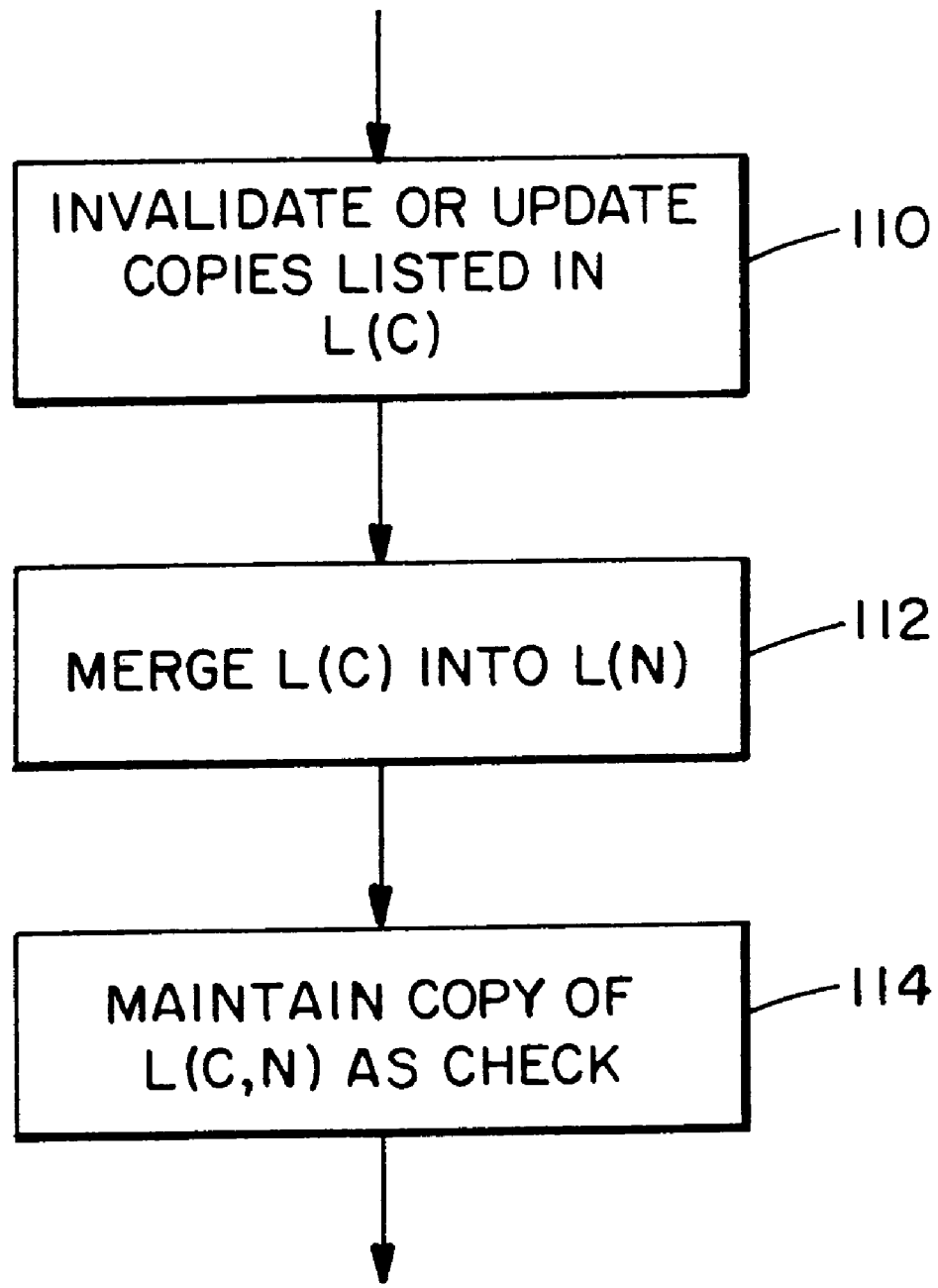
FIG. 11 is a sequence of steps performed upon receiving a gossip message from a neighboring cache server.

Referring to sequence of steps in FIG. 11, a first state 110 is entered by a neighboring cache server N upon receiving a gossip message from cache server C. In this state 110, the neighboring cache server N invalidates any copies it has of documents listed in L(C). In this state, the neighboring cache server N may also choose to refresh or update the copies it has of these documents.

In a next state 112, the neighboring cache server merges the list L(C) into its own list L(N). In particular, L(N) takes on a new value that represents the union of the L(N) and the received L(C).

In a following state 114, neighboring cache server N keeps a copy of L(C) as L(C, N) for the purpose of not forwarding the contents of L(C) back to cache server C, when it becomes time for neighboring cache server N to send cache server C a copy of its own list L(N).

By performing the steps shown in FIGS. 10A, 10B, and 11, the freshness of content that is to be served from a particular home server 20 is improved. This in turn reduces the need for the home server 20 to be polled periodically by the cache servers 16 to check for content freshness. In the absence of cooperation among the cache servers 16 as described above, the rate of queries submitted to the home servers 20 may grow linearly with the number of caches 16 and therefore overwhelm the home caches 20, which defeats the purpose of deploying the cache servers 16 in the first place.

While we have shown and described several embodiments in accordance with the present invention, it is to be understood that the invention is not limited thereto, but is susceptible to numerous changes and modifications as known to a person skilled in the art and we therefore do not wish to be limited to the details shown and described herein but intend to cover all such changes and modifications as are obvious to one of ordinary skill in the art.

What is claimed is:

1. In a system containing a plurality of computers which communicate over a network using communication protocols, with the computers at certain nodes in the network acting as home servers, for storing information in the form of documents, and with certain other computers acting as clients that send document request messages to the servers at an application layer, the document request messages being requests for documents stored at the servers, a method of maintaining copies of documents at the intermediate nodes comprising the steps of:

(a) storing local cache copies of documents at a plurality of intermediate node locations in the network;

(b) in response to a particular one of the clients generating a particular document request message intended to be sent to a particular one of the home servers, fulfilling the document request message at one of the intermediate node locations by intercepting the document request message and returning one of the local cache copies to the client;

(c) determining the identity of at least one neighboring intermediate node that stores local cache copies; and (d) determining if a local cache copy of a requested document is different from a copy of the requested document at the home server;

wherein step (d) further comprises the steps of:
  i) forwarding a hit report to a home server after fulfilling the document request message at one of the intermediate node locations; and
  ii) receiving a reply from the home server indicating a time of last modification of the requested document.

2. A method as in claim 1 wherein step (d) further comprises the step of:
  iii) if the time of last modification of the requested document indicates that the cache copy is no longer current, adding an identifier for the document to a list of modified documents.

3. A method as in claim 2 additionally comprising the step of:
  (e) sending a status message to at least one neighboring intermediate node, the status message including the list of modified documents.

4. A method as in claim 3 additionally comprising the step of:
  (f) before sending the list of modified documents to the neighboring intermediate node, removing any duplicate document identifiers corresponding to document information which has already been received from the particular neighboring intermediate node.

5. A method as in claim 2 additionally comprising the step of, at the neighboring intermediate node:
  (j) merging the list of modified documents received from the intermediate node with a list of modified documents maintained at the neighboring node.

6. A method as in claim 5 additionally comprising the step of, at the neighboring intermediate node:
  (k) maintaining a copy of the list of modified documents received from the intermediate node, in order to avoid returning duplicate document identifier information to the intermediate node when it is time for the neighboring intermediate node to send a status message to the intermediate node concerning the neighboring intermediate nodes' own information concerning document modifications.

7. A method as in claim 2 wherein step (c) further comprises the step of:
  sending status messages to the other intermediate nodes to determine the identity of neighboring cache servers.

8. A method as in claim 2 additionally comprising the step of:
- (g) deleting a document identifier from the list of modified documents once the document identifier has been sent to all neighboring cache servers.

9. A method as in claim 2 additionally comprising the step of, at the neighboring intermediate node:
- (h) upon receiving a list of modified documents, invalidating any cache copies corresponding to document identifiers on the list.

10. A method as in claim 1 wherein the clients send document request messages to the servers at an application layer level, and the document request messages are fulfilled by transparent proxying.

11. A method as in claim 10 wherein step (b) additionally comprises:
- fulfilling the particular application layer document request message at one of the intermediate node locations by intercepting the document request message and returning one of the local cache copies to the application layer at the client, such that the application layer request message is intercepted at the intermediate node and such that a network connection is not established with the application layer on the server.

12. A method as in claim 1 additionally comprising the steps of:
- at the home server, attaching a document modification time stamp to the document.

13. A method as in claim 1 wherein the document request messages are fulfilled at node locations through which the document request messages travel, and wherein step (b) additionally comprises the steps of:
- (i) determining a path for the particular document request message to travel from the particular client to the particular server along a path of nodes located in the network between the particular client and the particular server, the path comprising a plurality of the intermediate node locations; and
- (ii) fulfilling the particular document request message at one of the plurality of intermediate node locations in the determined path of nodes by, in response to receipt of the particular document request message, returning one of the local cache copies corresponding to a document specified in the particular document request message.

* * * * *